United States Patent Office 3,469,940
Patented Sept. 30, 1969

3,469,940
HYDRAZINE RECOVERY PROCESS
Brian John Needham and Michael Arthur Smith, Loughborough, England, assignors to Whiffen & Sons Limited, Loughborough, England
No Drawing. Continuation-in-part of application Ser. No. 386,786, July 31, 1964. This application Nov. 29, 1966, Ser. No. 597,558
Claims priority, application Great Britain, Aug. 20, 1963, 32,819/63
The portion of the term of the patent subsequent to July 25, 1984, has been disclaimed
Int. Cl. C01c *1/28;* C08f
U.S. Cl. 23—190                    12 Claims

ABSTRACT OF THE DISCLOSURE

A method is provided for obtaining hydrozine hydrate from hydrazine salts, which method involves contacting an aqueous solution of the hydrazine salt successively with two or more columns of an ion exchange resin and recovering hydrazine by washing the ion exchange resin with a water or a base.

---

The present application is a continuation-in-part of copending application Ser. No. 386,786 filed on July 31, 1964, and now abandoned.

The present invention relates to the recovery of hydrazine hydrate as an aqueous solution from its salts.

It has been found that hydrazine as its hydrate can be recovered from aqueous solutions of salts of hydrazine by treating the salts with an ion exchange material. Aqueous solutions of hydrazine are thought to exist as hydrazine hydrate and it is conventional to refer to hydrazine in aqueous solution as hydrazine hydrate.

Accordingly the present invention is for a process for obtaining hydrazine hydrate from water-soluble hydrazine salts which comprises contacting an aqueous solution of the hydrazine salt with an ion exchange resin and thereafter recovering hydrazine hydrate.

The ion exchange material used in the process of the present invention may be a cation exchange resin or an anion exchange resin. The cation exchange resin may comprise polymers such as polystyrene, styrene-divinyl benzene copolymers or polyphenols which are substituted with acidic groups such as sulphonic acid groups, carboxylic acid groups, phosphonic acid groups, phosphinic acid groups and the like. The anion exchange resin may comprise polymers such as polystyrene, styrene-divinyl benzene copolymers or polyphenols which are substituted with basic groups such as aromatic or aliphatic amines. Preferably the cation exchange material is a sulphonated styrene-divinyl benzene copolymer or a sulphonated polystyrene. Preferably the anion exchange resin is a polystyrene containing weakly basic amino groups for example diethylamino groups.

The ion exchange material used in the process of the present invention may also be a macroreticular cation exchange resin or a macroreticular anion exchange resin. The macroreticular resins are in the form of highly porous beads and have a rigid structure which makes them particularly stable compared with conventional resins which are of a gel-type and depend on bead swelling in water to give them a suitable porosity.

The method of recovering the hydrazine hydrate after contacting the salt with the ion exchange resin depends upon the nature of the ion exchange resin. If a cation exchange resin or a macroreticular cation exchange resin is used the hydrazine will be retained on the ion exchange resin and may be recovered therefrom by treating it with a base. In one embodiment of the present invention therefore a process is provided which comprises contacting an aqueous solution of a hydrazine salt with a cation exchange resin or a macroreticular cation exchange resin and recovering the hydrazine by a process which comprises separating the resin from the acid liberated as a result of contacting the resin with the hydrazine salt and treating the resin with an aqueous solution of a base to free the hydrazine from the cation exchange resin. The base may be aqueous solutions containing potassium or sodium hydroxide or the like but is suitably an aqueous solution of ammonia preferably containing 4% to 20% by weight of ammonia.

If an anion exchange resin or a macroreticular anion exchange resin is used the anion component of the hydrazine salt is retained by the resin and an aqueous solution or hydrazine is separated. In another embodiment of the present invention therefore a process is provided which comprises contacting an aqueous solution of a hydrazine salt with an anion exchange resin or a macroreticular anion exchange resin and recovering the hydrazine hydrate by a process which comprises separating the hydrazine hydrate as an aqueous solution from the resin. The anion exchange resin or macroreticular anion exchange resin may be regenerated by treating with acid.

It is preferred in the process of the present invention to use the ion exchange resin in such quantities that the acidic or basic capacity of the ion exchange resin is utilised to 50% to 100% by weight. Desirably it is preferred to use the ion exchange resin in such quantities that the acidic or basic capacity of the ion exchange resin is utilised to 80% to 100% by weight.

Preferably the ion exchange resin is used in the form of a stationary bed through which the solution of hydrazine salt is passed. The stationary bed will usually be in the form of a column of the resin.

If the resin is to be used to its full capacity there is a danger that, as the resin approaches saturation, some of the hydrazine salt may escape treatment. It is therefore preferred to use the resin in a series of beds or columns, the beds or columns subsequent to the first absorbing any hydrazine salt which is left untreated by the first. As the first bed or column becomes saturated it is removed for regeneration and the second bed or column becomes the first.

Preferably the temperature at which the process of the present invention is conducted, whether using cation or anion exchange resins, is in the range 15° C. to the boiling point of the reaction mixture or that temperature which is the maximum permissible for the particular resin. For instance the maximum temperature at which sulphonated polystyrenes or polystryrenes containing diethylamino groups can be used is of the order of 100° C.

Examples of the hydrazine salts which may be employed in the process of the present invention include dihydrazine sulphate, hydrazine monohydrochloride, hydrazine dihydrochloride, hydrazine mononitrate, hydrazine dinitrate, hydrazine hydrobromides, monohydazine phosphate, dihydrazine hypophosphate, hydrazine oxalate or hydrazine formate. Suitably the aqueous solution of hydrazine salt contains 2 to 30% by weight of hydrazine salt.

The following examples, in which parts are by weight, are given to illustrate the process of the present invention.

Example 1

A solution of dihydrazine sulphate (2 parts) in water (25 parts) was slowly passed down a column of polystyrene resin containing diethylamine groups, commercially available as De-Acidite G (10 parts; 3.5 milliequivalents per gram). The column was washed free of hydrazine with water. 99% of the hydrazine was recovered as its salt and hydrazine hydrate, 23% of the salt having been converted to the hydrate. It was possible to obtain a 98% conversion to hydrazine hydrate by recirculating the liquors three times.

Example 2

A solution of dihydrazine sulphate (4.5 parts) in water (25 parts) was passed down a column of a sulphonated polystyrene, commercially available as Zeo-Karb 225 (35 parts; 2.38 milliequivalents per gram). The column was washed with water to remove sulphate and then with an aqueous solution of ammonia (60 parts of a 10% solution) when hydrazine hydrate (2.82 parts) was extracted.

Example 3

A 10% aqueous solution of dihydrazine sulphate (600 parts) was passed down a column of a sulphonated polystyrene cation exchange resin, commercially available as Zeo-Karb 225 (250 parts; 2.2 millequivalents per gram). The effluent was passed down a second column of Zeo-Karb 225 (250 parts) which absorbed the excess of hydrazinium ions and allowed the first column to be used to its full capacity. The columns were washed with water until free of sulphate ions and finally the first column was eluted with a 16% solution of aqueous ammonia (500 parts). Hydrazine hydrate (27.5 parts) was contained in 110 parts of the effluent. The second column was used to its full capacity as above before regeneration.

Example 4

A solution of hydrazine monohydrochloride (2.4 parts) in water (50 parts) was slowly passed down a column of a polystyrene resin containing diethylamino groups, commercially available as De-Acidite G (25 parts; 3.5 milliequivalents per gram). The resin absorbed the chloride ion and hydrazine hydrate was recovered quantitatively by elution of the resin bed with water.

Example 5

A 10% aqueous solution of monohydrazine phosphate (1000 parts) was slowly passed down two columns of a polystyrene resin containing phosphonic acid groups, commercially available as Duolite C63 (250 parts; 3.1 milliequivalents per gram) in series. The columns were washed with water to remove phosphate ions. Hydrazine hydrate (33 parts) was recovered from the first column as a 23% solution by elution with 16% aqueous solution of ammonia (500 parts).

Example 6

A solution of monohydrazine hydrochloride (20 parts) in water (400 parts) was slowly passed down a column of a weakly basic anion exchange resin, commercially available as Amberlite IRE–93 (250 parts) to absorb the chloride ion. Hydrazine hydrate was recovered quantitatively from the resin by elution with water.

Example 7

A solution of dihydrazine sulphate (5 parts) in water (25 parts) was passed down a column of Zeo-Karb 225T (84 parts) in the hydrogen form. The column was then washed free of sulphate with water. Hydrazine hydrate (2 parts) was recovered quantitatively from the resin by elution with an aqueous solution of ammonia (100 parts 10%) (Zeo-Karb 225T is a registered trademark for a strongly acid unifunctional macroreticular sulphonated crosslinked polystyrene cation exchange resin containing sulphonic acid groups).

Example 8

A solution of dihydrazine sulphate (162 parts) in water (800 parts) was passed down a column containing 1,000 parts of Amberite 911 in the hydroxide form. The resin was then washed free of hydrazine with water. The hydrazine was recovered quantitatively and was free of sulphate ions. The resin was regenerated with 4% w./v. caustic soda solution. (Amberlite 911 is a registered trademark for a strongly basic macroreticular anion exchange resin.)

Example 9

A 20% aqueous solution of dihydrazine sulphate (200 parts) was passed down a column of De-Acidite F.F. (ip.) in its hydroxide form (250 parts 1.3 meq./g.) at a rate of 0.1 bed-volumes per minute. The column was then washed with water (500 parts) at a rate of 0.2 bed-volumes/minute. A 7% solution of hydrazine hydrate, free of sulphate ions was obtained in the main fraction of the column effluent. The resin was regenerated with three bed-volumes of a 4% solution of sodium hydroxide.

De-Acidite F.F. is a registered trademark for a highly basic, unifunctional, cross-linked polystyrene resin, containing quaternary ammonium (trimethyl benzylamine) groups.

Example 10

A 10% aqueous solution of dihydrazine sulphate (600 parts) was passed down a column of Amberlite 200 (250 parts 2.0 meq./g.) in the hydrogen form. The effluent was passed down a second column of the resin (250 parts) which absorbed the excess of hydrazinium ions and allowed the first column to be used to its full capacity. The first column was washed with water until free of sulphate ions and then eluted with a 16% aqueous ammonia solution (500 parts). Hydrazine hydrate was obtained as a 25% solution in the middle fraction of the effluent. The column was washed free of ammonia with water and regenerated to its hydrogen form using 10% w./w. sulphuric acid (500 parts).

Amberlite 200 is a registed trademark for a macroreticular polystyrene-divinyl benzene copolymer containing sulphonic acid groups.

We claim:

1. A process for obtaining hydrazine hydrate from water-soluble hydrazine salts which comprises contacting an aqueous solution of the hydrazine salt successively with two or more columns of an ion exchange resin and recovering the hydrazine by washing the ion exchange resin with a member selected from the group consisting of water and a base.

2. A process as claimed in claim 1 wherein the ion exchange resin is a cation exchange resin and wherein the hydrazine hydrate is recovered by a process which comprises separating the resin from the acid liberated as a result of contacting the resin with the hydrazine salt and treating the resin with an aqueous solution of a base to free the hydrazine as hydrazine hydrate.

3. A process as claimed in claim 2 wherein the cation exchange resin is a macroreticular cation exchange resin.

4. A process as claiced in claim 2 wherein the cation exchange resin is selected from the group consisting of sulphonated polystyrenes, sulphonated styrene divinylbenzene copolymers, sulphonated polyphenols, polystyrenes containing carboxylic acid groups, styrene divinylbenzene copolymers containing carboxylic acid groups, polyphenols containing carboxylic acid groups, polystyrene containing phosphonic acid groups, styrene divinylbenzene copolymers containing phosphonic acid groups, polyphenols containing phosphonic acid groups, polystyrenes containing phosphinic acid groups, styrene divinylbenzene copolymers containing phosphinic acid groups and polyphenols containing phosphinic acid groups.

5. A process as claimed in claim 4 wherein the cation exchange resin is a macroreticular cation exchange resin.

6. A process as claimed in claim 2 wherein the base is ammonia.

7. A process as claimed in claim 2 wherein the aqueous solution of a base is an aqueous solution of ammonia containing 4% to 20% by weight of ammonia.

8. A process as claimed in claim 2 wherein the hydrazino salt is selected from the group consisting of dihydrazine sulphate, hydrazine monohydrochloride, hydrazine dihydrochloride, hydrazine mononitrate, monohydrazine phosphate and dihydrazine hypophosphate.

9. A process as claimed in claim 1 wherein the ion exchange resin is an anion exchange resin and wherein the hydrazine hydrate is recovered by separating the hydrazine hydrate as an aqueous solution from the anion exchange resin.

10. A process as claimed in claim 9 wherein the anion exchange resin is is a macroreticular anion exchange resin.

11. A process as claimed in claim 9 wherein the anion exchange resin is selected from the group consisting of polystyrene containing weakly basic amino groups, styrene divinylbenzene copolymers containing weakly basic amino groups and polyphenols containing weakly basic amino groups.

12. A process as claimed in claim 9 wherein the hydrazine salt is selected from the group consisting of dihydrazine sulphate, hydrazine monohydrochloride, hydrazine dihydrochloride, hydrazine mononitrate, monohydrazine phosphate and dihydrazine hypophosphate.

References Cited

UNITED STATES PATENTS

| | | | |
|---|---|---|---|
| 2,570,822 | 10/1951 | Kressman | 260—2.1 |
| 3,332,739 | 7/1967 | Needham et al. | 23—190 |

OSCAR R. VERTIZ, Primary Examiner

HOKE S. MILLER, Assistant Examiner

U.S. Cl. X.R.

260—2.1